(12) United States Patent
Jukarainen

(10) Patent No.: US 7,254,123 B2
(45) Date of Patent: Aug. 7, 2007

(54) CONTROL OF A WIRELESS CONFERENCE TELEPHONE SYSTEM

(75) Inventor: Jarkko Jukarainen, Espoo (FI)

(73) Assignee: IP Holding OY, Espoo (FI)

( * ) Notice: Subject to any disclaimer, the term of this patent is extended or adjusted under 35 U.S.C. 154(b) by 609 days.

(21) Appl. No.: 10/475,006

(22) PCT Filed: Apr. 19, 2002

(86) PCT No.: PCT/FI02/00327

§ 371 (c)(1),
(2), (4) Date: Dec. 16, 2003

(87) PCT Pub. No.: WO02/087205

PCT Pub. Date: Oct. 31, 2002

(65) Prior Publication Data

US 2004/0146031 A1 Jul. 29, 2004

(30) Foreign Application Priority Data

Apr. 19, 2001 (FI) .................................. 20010806

(51) Int. Cl.
*H04B 7/212* (2006.01)
(52) U.S. Cl. ................. 370/337; 370/349; 379/202.01; 379/37; 455/556.1; 455/41.2
(58) Field of Classification Search .. 348/14.01–14.09, 348/14.1, 14.11, 14.12, 14.13; 379/202.01, 379/37; 709/204, 203, 217; 455/556.1, 455/74.1, 41.2; 340/501; 370/337, 349
See application file for complete search history.

(56) References Cited

U.S. PATENT DOCUMENTS 4,669,108 A 5/1987 Deinzer 6,646,564 B1 * 11/2003 Azieres et al. .............. 340/679
6,968,365 B2 * 11/2005 Hollstrom et al. .......... 709/217

FOREIGN PATENT DOCUMENTS

EP 1161114 A2 5/2001

(Continued)

OTHER PUBLICATIONS

Pulido, "Hands-Free Profile," Confidential Bluetooth SIG, p. 1 (2001).

(Continued)

*Primary Examiner*—Melur Ramakrishnaiah
(74) *Attorney, Agent, or Firm*—Birch, Stewart, Kolasch & Birch, LLP

(57) ABSTRACT

Wireless conference telephone system or a corresponding audio system, the system comprising of at least one audio unit (B1-B3) having at least one microphone and/or at least one speaker (SPK1-SPK4), an audio control unit (UI1), and a power source, at least one signal source unit (C1), and at least one operation control unit with which the user can control the operation of the wireless control unit coupled to the audio unit(s) over a digital personal area network standard, such as Bluetooth radio standard, capable of forming said connection. The operation control unit communicates with the audio unit(s) by using a wireless protocol, such as WAP, and the operation control unit has a user interface so that the user controls the operation of the system over a user interface, such as WML, operating over the wireless protocol.

15 Claims, 3 Drawing Sheets

FOREIGN PATENT DOCUMENTS

Figure 1:
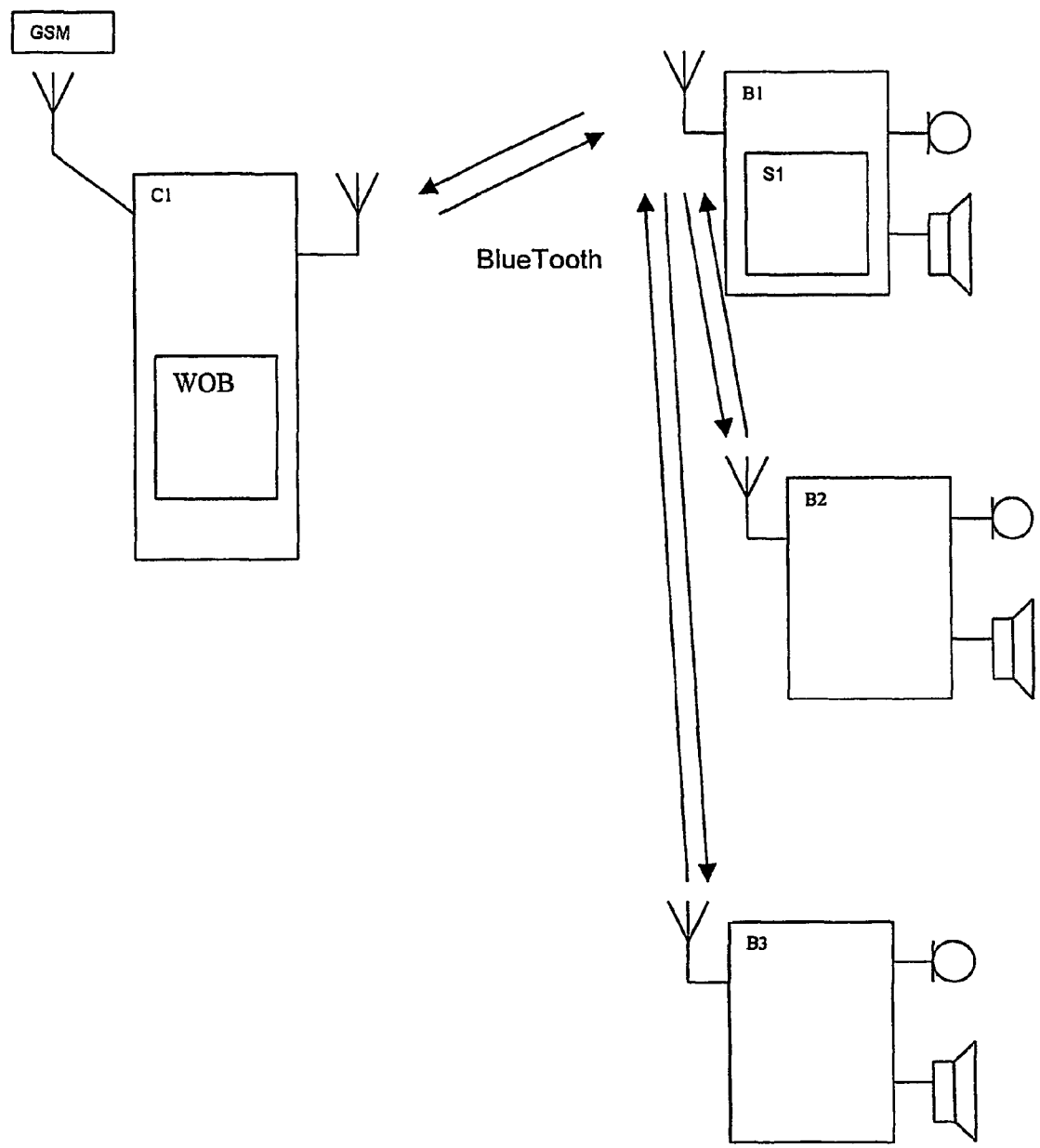

| | | | |
|---|---|---|---|
| JP | 10-136100 | * | 5/1998 |
| JP | 10-136100 A | | 5/1998 |
| KR | 010025661 A | | 4/2001 |
| WO | WO 99/03253 A1 | | 1/1999 |
| WO | WO 0030375 A2 | | 5/2000 |
| WO | WO 0069186 | | 11/2000 |
| WO | WO 01/89156 A2 | | 11/2001 |

OTHER PUBLICATIONS

Jesus A.G.Pulido, "Hands-Free Profile," Confidential Bluetooth DOC, pp. 1-70 (Oct. 22, 2001).

* cited by examiner

CONTROL OF A WIRELESS CONFERENCE TELEPHONE SYSTEM

This invention relates to a method of controlling a wireless conference telephone system or a corresponding audio system according to preamble of claim 1 and to a wireless conference telephone system having at least one audio unit and a control unit.

U.S. Pat. No. 4,669,108 discloses a wireless hands-free conference telephone system including a remotely positionable, self-powered microphone/FM transmitter for picking up voice signals and transmitting same to a control unit which is connected in wired relation to a commercial telephone line. A loudspeaker is positioned in wired relation to the control unit for broadcasting the incoming signal from the commercial telephone line. The control unit and the telephone may be positioned in a separate room adjacent the room in which the remote transmitter and loudspeaker are positioned. The loudspeaker may be positioned on the dividing wall. The microphone/transmitter is preferably positioned centrally on a conference table where it may pick up sound both directly and as reflected from the table top. The control unit includes an FM receiver, a portion of the loudspeaker circuit including an amplifier, and a voice switching circuit.

The voice switching circuit monitors the incoming voice signal and the outgoing voice signal and increases the gain on the strongest signal while decreasing the gain on the weaker signal in order to avoid feedback problems as well as to provide enhanced communication capabilities between the conversing parties.

WO 99/03253 discloses an apparatus for allowing participants in a meeting or a conference to make contributions using a mobile telephone, or any other telephone, as a conference microphone. The public telephone network (PTN) is used in connection with a prior art loudspeaker system. A service node is used to connect the telephone network and the loudspeaker system. A data terminal with an Internet connection can be used for setting up a conference and for control and supervision.

The prior art conference telephone systems described above have a complicated structure, especially as they consist of separate microphones, speakers and control units. Further, they are fixed, and they need a wired connection to the PTN. Additionally, the signal source cannot be selected, and neither the microphones nor the speakers can be controlled remotely.

It is also known to use a mobile phone as a conference telephone. However, the acoustic properties of the microphones and speakers in mobile phones are generally quite insufficient for such applications, and it is impractical to use a mobile phone as a conference microphone or a conference speaker in the extended usage scenarios that the proposed invention provides.

It is an object of the present invention to provide an improved control method of controlling a wireless conference telephone system wherein the user can control several functions in the wireless conference telephone system by using a mobile phone or a corresponding Personal Trusted Device (PTD).

It is also an object of the present invention to provide a new wireless conference telephone system wherein the system comprises one or several conference audio units having high quality acoustic properties and capable of having contact with other similar audio units and further having several additional operations, such as speaker unit, radio tuner, MP3 player etc.

The invention is based on the utilization of the Bluetooth units in the audio units and in the controlling PTD (Personal Trusted Device; Mobile Terminal Unit). The Bluetooth system as described for example in WO 00/69186 provides low-power, low-cost radio interfaces between different kind of radio units and their accessories. Bluetooth is a universal radio interface operating within the 2.4 GHz ISM band and enables portable electronic devices to connect and communicate wirelessly via short-range, ad hoc networks (localradio networks). The Bluetooth system uses a frequency-hop spread spectrum technique where the frequency band is divided into several hop channels. During a connection, radio units with Bluetooth transceivers hop from one channel to the other in a pseudo-random fashion. Each channel is divided into a number of slots in a time division multiplexing scheme, where a different hop frequency is used for each slot. A radio unit with Bluetooth can simultaneously communicate with several other radio units in a small local radio network called a piconet. Each piconet is established by a unique frequency-hopping channel, i.e. all radio units in a specific piconet share the same frequency hopping scheme. One radio unit acts as a master, controlling the traffic in the piconet, and the other radio units in the piconet act as slaves.

To achieve the objects of the present invention the conference telephone system or a corresponding audio system is controlled by wireless control of the conference audio units by using wireless protocol, such as WAP, and a user interface over Bluetooth.

Correspondingly, each audio unit and control unit in the system comprises a Bluetooth unit and is capable of using wireless protocol, such as WAP, when controlling the operation of system.

The characteristic features of the present invention are in detail described in the claims.

Controlling the conference audio system according to the invention is very simple and easy, especially as the user can control the system with a wireless control unit, for example his own mobile phone having WAP and suitable browser, such as a WML microbrowser, with which the user can give control instructions to the system. The user can very easily establish an ad hoc conference call system irregardless of room, and even a personal speaker system. Further, the control software operating in the memory of the audio unit is easy to update, even remotely, over Bluetooth.

Further, the audio unit is wireless and has compact size and is easy to carry along. Therefore, for example a traveler can take the audio unit with him to a trip, and he can use his unit also as a terminal device for other sensors like fire alarm or motion alarm. In a hotel room the user can use an audio unit as a motion sensor in a door. If door moves, alarm will go to the audio unit. Alternatively, it can be used as a fire sensor as well. These functions the user can set up and control by either using the control buttons on the audio unit itself or via the connected Bluetooth enabled mobile phone as described above.

Figure 2:
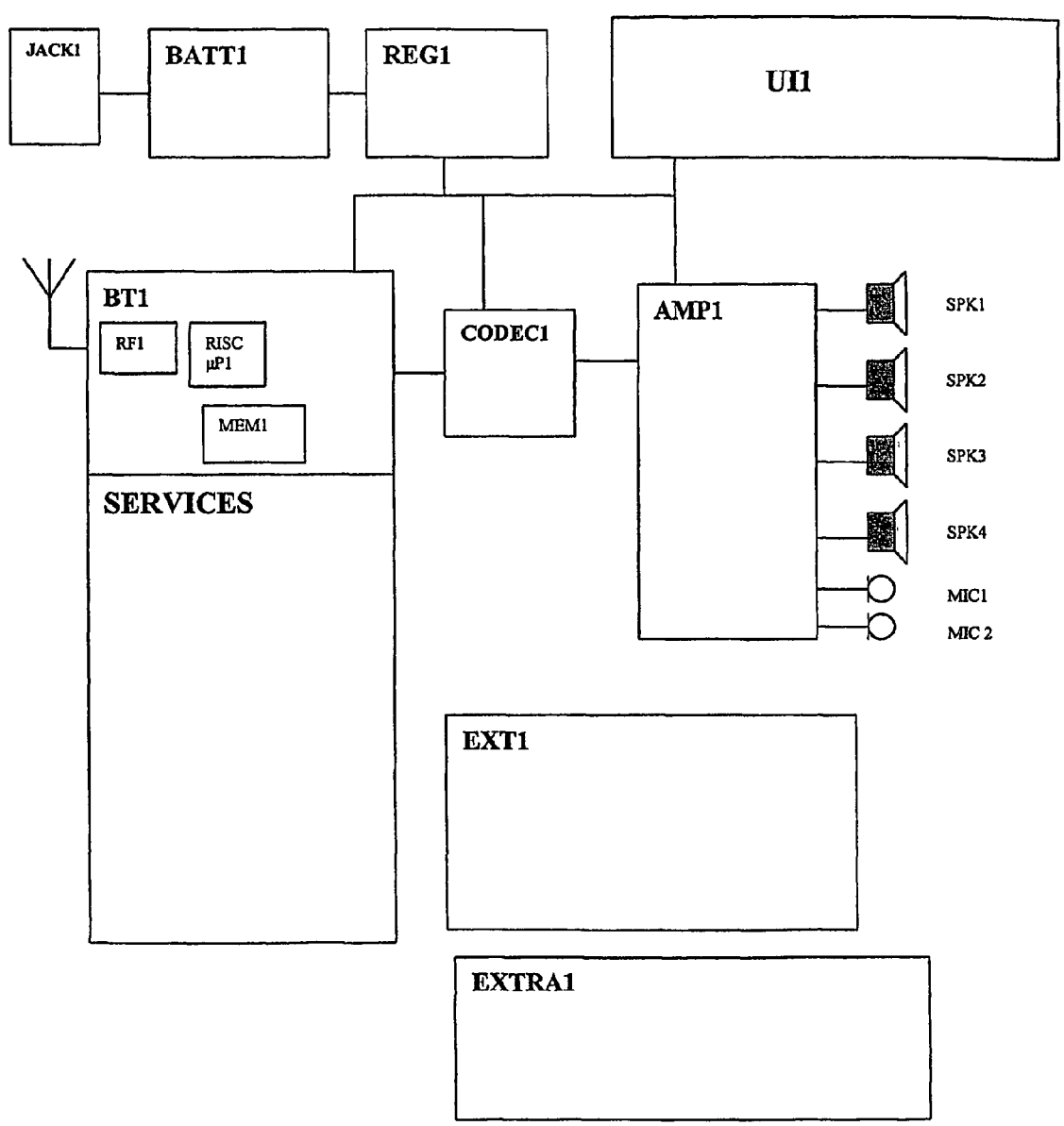
Figure 3:
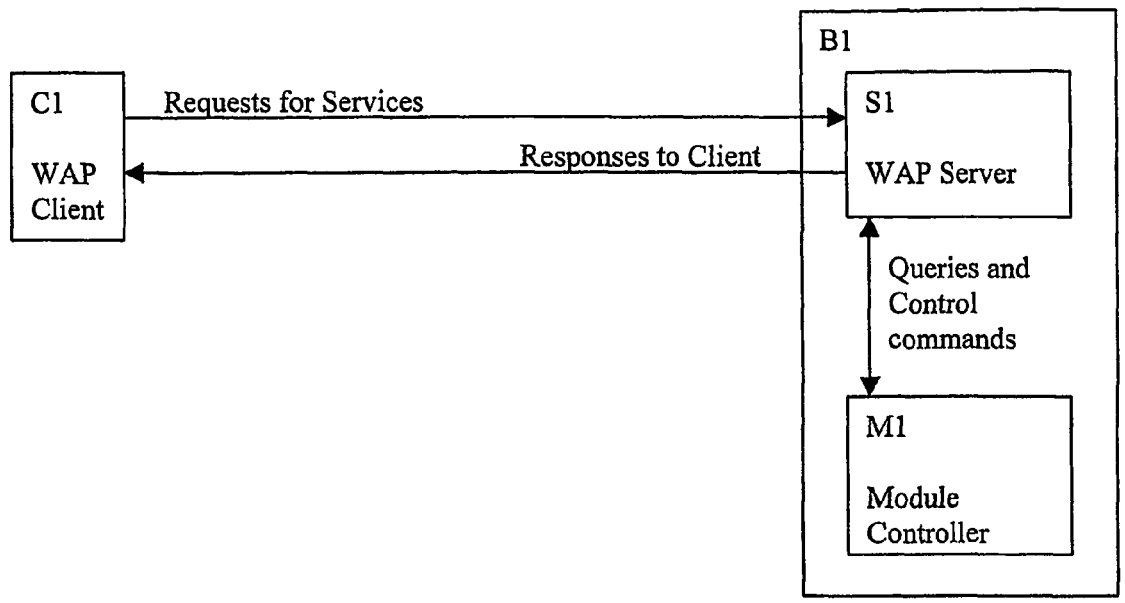
Figure 4:
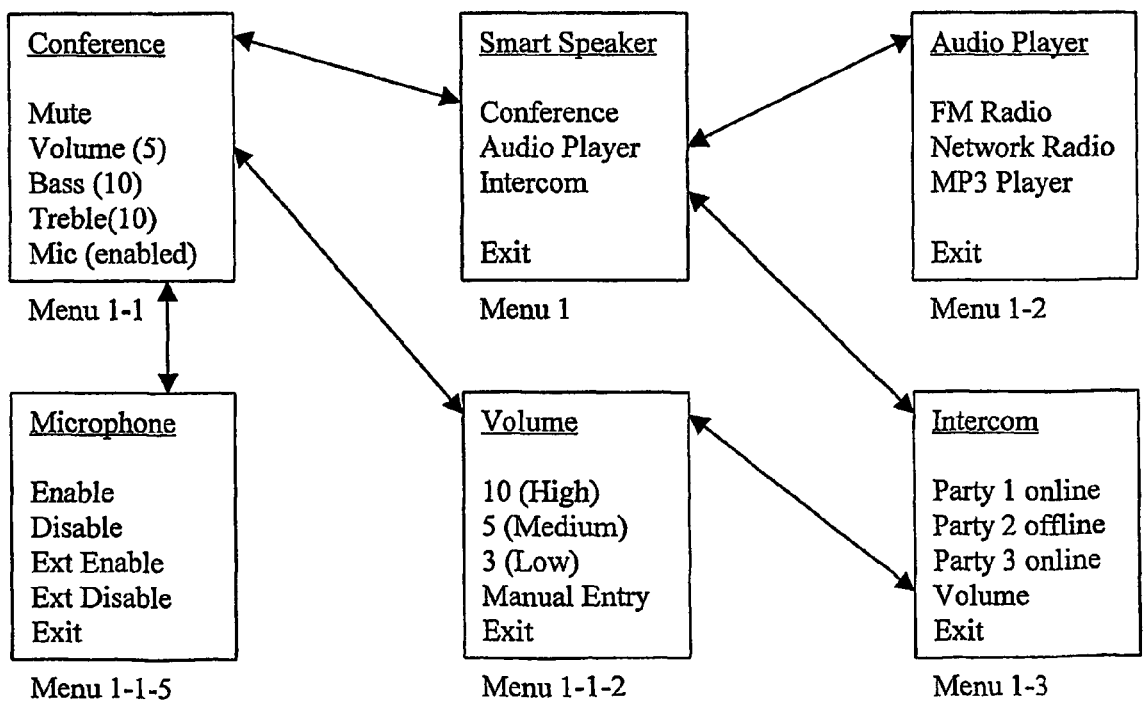

The invention is explained in detail in the following by referring to the enclosed drawings presenting exemplary embodiments of the invention, where FIG. 1 presents a wireless conference telephone system according to the invention, FIG. 2 presents a block diagram of the conference call unit, FIG. 3 presents an control software architecture overview, and FIG. 4 presents an example of a menu hierarchy.

The wireless conference telephone system according to the present invention consists of one to three conference audio units B1-B3 comprising a microphone, stereo speakers, a Bluetooth unit, a control unit and an internal battery as described below, and a wireless control unit C1 having a Bluetooth unit and a WAP browser. In addition, the conference call units and the control unit support WAP over Bluetooth (so called WOB).

The user can control the conference audio units B1 to B3 by using his PTD C1 as a control unit which supports WAP over Bluetooth, and which can be for example a mobile phone. The control is wireless.

The user can control at least following functions in the conference audio unit operating as a standalone device by using WOB with his PTD: volume, mute, tone control (bass/treble), activate audio (conference) call to the conference call unit B1, activate intercom call to another Bluetooth audio device, activate power save mode (Stand by), wake up the conference call unit B1 from stand by mode (ON), radio tuner (scan and change channels), Mp3 player (play, stop, ff, fr, next-, previous song), monitor conference call unit B1 battery status (full . . . low), microphone sensitivity control, page/name discovery of other Bluetooth devices and display them in PTD display, make connections between conference call unit B1 and other Bluetooth devices, activate audio recorder, manual change of master/slave. The audio stream can also be transferred to the speakers in the conference audio units from the user's PTD or other audio source unit.

If the user has an audio call over his PTD, he can change audio routing to the conference audio unit B1, wirelessly and hands free. User can adjust the volume and tone in the conference audio unit B1 with his PTD C1. He can also adjust manually the microphone sensitivity, even if the sensitivity can normally be regulated automatically. During an audio call the user can also search other Bluetooth devices, such as other conference audio units B2, B3 within the Bluetooth range, with help of the conference call unit B1.

If there are several Bluetooth audio units within the Bluetooth range, the user can establish a piconet consisting of his PTD and the conference call units by making first a connection between his PTD and the master conference audio unit which in turn connects the other conference audio units operating as slaves to the piconet. In this way the user can for example connect the conference audio units within the Bluetooth range to an ongoing audio call and control them—wirelessly over a digital radio network such has Bluetooth using the described methodology.

The standalone conference audio units B1 to B3 (FIG. 2) have a Bluetooth module BT1 comprising a RF unit RF1, a processor unit (RISC) μP1 and a memory MEM1. The services, such as a real time clock, volume and tone control, MP3 decoder, radio tuner etc., can be controlled for example with WML pages operating in the memory described later in detail.

The units B1 to B3 may further consist, for example, of four speakers SPK1 to SPK4, two microphones MIC1 and MIC2, an amplifier AMP1 operating as a stereo amplifier, a code CODEC1, a user interface U1 and a power source consisting of a battery-charger unit BATT1, power regulator REG1 and a DC jack JACK1 for external power source.

The unit may further have external interfaces EXT1, such as a compact flash card, MMC (multimedia card), and USB. The unit may further have extra features (EXTRA1), such as alarm sensors control (fire, motion).

External power supply can connect to DC jack JACK1. External power is needed to charge battery inside the unit. Power regulation REG1 generates required voltages. User interface U11 may include a display, a keyboard (buttons) and LEDs. Compact flash and Multi Media card interface may be used for external information storage, like MP3 files. The Codec makes analog-to-digital transformations for the audio signals and vice versa. The MP3 decoder is either a microprocessor or a MP3 decoder chip, which is located in the codec. The amplifier AMP1 contains power amplifiers to all speakers SPK1 to SPK4 (stereo audio) and microphone amplifiers.

The Bluetooth module BT1 itself includes all the necessary functions for Bluetooth communication such as baseband, memory and radio frequency units. An antenna will be also integrated. Inside the Bluetooth module a RISC processor will handle also other functions/features of the unit, such as WAP-server, MP3 control, radio control, external interfaces control, user interface controls, monitoring battery capacity as well as volume and tone controls.

The audio unit (B1 in FIG. 3) will be controlled by the user with a PTD C1 capable of using WAP over Bluetooth (WOB). The devices C1 and B1 are connected with Bluetooth and after that terminal C1 will use WAP to request a homepage from S1, which is the WAP server running in the memory of the unit B1. The server S1 determines the current situation of the device by querying module controller M1. Response is sent in a WML page to terminal C1.

The user of PTD C1 makes appropriate decisions and controls for unit B1 by sending WAP requests to server S1. Depending on the request, server SI makes appropriate queries and sends appropriate commands to controller M1, controlling and monitoring the whole unit B1.

An example of the hierarchy and the content of the controlling WML pages is shown in FIG. 4. The pages can be divided into three categories: Main menu (Menu 1), Mode menus (like Menu 1-1) and Command menus (Menu 1-1-1).

Main menu is the first page shown to the user when he connects to the device. From the main menu user can choose, in which way he wants to use the device.

The Mode menus show the current state and possible functions available, when the device is in selected operation mode.

Command menu is launched from mode menu. From this menu the user can for example change a value of certain setting or confirm an action.

It is obvious to the person skilled in the art that different embodiments of the invention are not restricted to the examples presented above, but that they may be varied within the enclosed claims. As an example, instead of WAP also other wireless protocols and techniques, such as iMode, may be used.

The invention claimed is:

1. A method of controlling a wireless conference telephone system or a corresponding audio system, the system comprising:
   at least one audio unit having at least one microphone and/or at least one speaker an audio control unit,
   at least one signal source unit, and
   at least one operation control unit with which a user controls the operation of the at least one audio unit,
   wherein the method comprises the steps of:
   connecting the at least one operation control unit, which is a wireless control unit, to the system over a wireless digital personal area network standard the at least one operation control unit capable of forming said connection, the at least one operation control unit communicating with the at least one audio unit by using a wireless protocol, and controlling the operation of the system with a user interface operating over the wireless protocol, and the method further comprising the steps of:

first connecting the at least one operation control unit and the at least one audio unit are first connected over the wireless digital personal area network standard, and after that using the at least one operation control unit for requesting at least one control page over the wireless protocol from a control server, which is the server running inside the at least one audio unit, and sending a response is sent in a wireless data format or corresponding page format, to the at least one operation control unit.

2. The method according to claim 1, wherein the at least one signal source unit is a wireless signal source unit, capable of transferring the audio information to and/or from the conference telephone system, and wherein the wireless source unit and the at least one audio unit are connected to each other over the wireless digital personal area network standard, the wireless digital personal area network standard being Bluetooth radio standard, and the wireless signal source unit being capable of forming said connection.

3. The method according to claim 2, further comprising the step of:

operating the at least one signal source unit as the at least one operation control unit.

4. The method according to claim 2, wherein the at least one signal source unit and the at least one operation control unit are separate units.

5. The method according to claim 1, further comprising the steps of:

controlling at least one of the following audio functions in the at least one audio unit over a wireless protocol using a Personal Trusted Device (PTD): volume, mute, bass/treble tone control, and controlling at least one of the following operational functions in the audio unit over a wireless protocol using the (PTD): activating an audio conference call to the at least one audio unit, activating an intercom call to a Bluetooth audio unit, making connections between the at least one audio unit and the Bluetooth audio unit.

6. A wireless conference telephone system or a corresponding audio system, the system comprising:

at least one audio unit having at least one microphone and/or at least one speaker, an audio control unit, and a power source, at least one signal source unit, and at least one operation control unit with which operable by a user for controlling an operation of the at least one audio unit, wherein the at least one operation control unit is a wireless control unit coupled to the at least one audio unit over a wireless digital personal area network standard, the at least one operation control unit capable of forming said connection, wherein the at least one operation control unit communicates with the at least one audio unit by using a wireless protocol, and wherein the at least one operation control unit has a user interface so that the user controls the operation of the system over a user interface operating over the wireless protocol, wherein the at least one audio unit comprises:

a wireless digital personal area network standard module having a RF unit, a processor unit, and a memory, the memory having a control server, with a user interface for the wireless control unit operating in the memory.

7. The system according to claim 6, wherein the at least one signal source is a wireless signal source unit capable of transferring conference audio information to and/or from the conference telephone system, and wherein the wireless source unit and the at least one audio unit are connected to each other over the wireless digital personal area network standard, the wireless digital personal area network standard being Bluetooth radio standard, and the wireless source unit being capable of forming said connection.

8. The system according to claim 6, the system further comprising:

at least two audio units each communicating with the wireless control unit directly or via a master unit.

9. The system according to claim 6, wherein the at least one audio unit is a single standalone unit having at least one microphone and at least one speaker, an audio control unit, and a power source in a single housing, and wherein as exterior housing covers are removable and changeable to accommodate to a taste of a user.

10. The system according to claim 9, wherein the taste of the user includes a cover with a different color.

11. The system according to claim 6, wherein control of the system is based on interface menus, which capable of controlling Wireless Markup Language (WML) pages, and are divided into different operational categories.

12. The system according to claim 11, wherein the different operational categories include:

main menus, mode menus, and command menus, wherein the main menus are the pages shown to the user when he/she connects to the at least one audio unit, the mode menus show the current state and functions that are available when the at least one audio unit is in selected operation mode, and the command menus are for changing a value of certain setting or confirming an action.

13. The system according to claim 6, wherein the at least one audio unit also operates a terminal device for other operations, wherein functions for the other operations are set up and controlled by either using control buttons on the at least one audio unit or via the connected wireless control unit.

14. The system according to claim 6, the at least one signal source unit is located in the at least one audio unit.

15. The system according to claim 6, wherein the processor unit is a Reduced Instruction Set Computing (RISC) processor unit.

* * * * *